US006995827B2

(12) United States Patent
Chien et al.

(10) Patent No.: US 6,995,827 B2
(45) Date of Patent: *Feb. 7, 2006

(54) LIQUID CRYSTAL DISPLAY

(75) Inventors: Chin Cheng Chien, Tainan (TW); Wang Yang Li, Tainan (TW)

(73) Assignee: Chi Mei Optoelectronics Corp., Tainan (TW)

(*) Notice: Subject to any disclaimer, the term of this patent is extended or adjusted under 35 U.S.C. 154(b) by 0 days.

This patent is subject to a terminal disclaimer.

(21) Appl. No.: 10/985,047

(22) Filed: Nov. 10, 2004

(65) Prior Publication Data

US 2005/0083469 A1    Apr. 21, 2005

Related U.S. Application Data

(63) Continuation of application No. 10/348,901, filed on Jan. 23, 2003, now Pat. No. 6,839,112.

(30) Foreign Application Priority Data

Feb. 4, 2002  (TW) ............................... 91102042 A

(51) Int. Cl.
 *G02F 1/1343* (2006.01)
(52) U.S. Cl. ..................................... 349/143; 349/130
(58) Field of Classification Search ............ 349/38–39, 349/130, 143
 See application file for complete search history.

(56) References Cited

U.S. PATENT DOCUMENTS

| 6,278,503 B1 | 8/2001 | Nishikawa et al. |
| 6,424,398 B1 * | 7/2002 | Taniguchi ................... 349/143 |
| 6,567,144 B1 | 5/2003 | Kim et al. |

* cited by examiner

*Primary Examiner*—Toan Ton
(74) *Attorney, Agent, or Firm*—Finnegan, Henderson, Farabow, Garrett & Dunner, L.L.P.

(57) ABSTRACT

A liquid crystal display mainly includes a first substrate and a second substrate; a liquid crystal having a negative dielectric constant anisotropy between the first and second substrates; and an array of first protrusions, second protrusions and third protrusions for setting the orientation of liquid crystal molecules inside pixels to a plurality of mutually different directions. The first protrusions are formed on pixel electrodes of the second substrate. Every two of the first protrusions are arranged substantially in a V-shaped pattern. The first and second protrusions are arranged alternately and in parallel to one another. The liquid crystal display of the present invention is provided with a plurality of first capacitor electrodes each in a K-shaped pattern and a plurality of second capacitor electrodes each in a V-shaped pattern wherein the first and second capacitor electrodes and the first protrusions are formed in spatially opposed relation to one another.

3 Claims, 8 Drawing Sheets

LIQUID CRYSTAL DISPLAY

This is a continuation of application Ser. No. 10/348,901, filed on Jan. 23, 2003, now U.S. Pat. No. 6,839,112, which claims the benefit of Taiwanese Application No. 091102042, filed on Feb. 4, 2002. The entire contents of these related applications are incorporated herein by reference.

BACKGROUND OF THE INVENTION

1. Field of the Invention

The present invention relates to a liquid crystal display (LCD), and more particularly to a vertically-aligned (VA) LCD wherein the orientation of the liquid crystal molecules inside pixels are set to a plurality of mutually different directions.

2. Description of the Related Art

Liquid crystal display mainly comprises a liquid crystal display unit having two glass substrates oppositely positioned and a liquid crystal layer interposed therebetween. Vertically-aligned (VA) LCD is a mode using a liquid crystal material with negative dielectric constant anisotropy and vertical alignment films. In the absence of an applied electric field, the liquid crystal molecules are aligned in a vertical direction and a black display appears. When a predetermined electric field is applied, the liquid crystal molecules are aligned in a horizontal direction and a white display appears. Compared to the twisted nematic (TN) LCD, the vertically-aligned (VA) LCD provides higher contrast, higher response speed, and excellent viewing angle.

However, the VA LCDs still suffer from the problems of decreased contrast ratio and contrast reversal when viewed in different directions other than perpendicular to the display area. This is due to the birefringence effect of the liquid crystal molecules inside the liquid crystal display unit. When the incident light passing through the LCD unit at other than a normal angle, such light will interact with the liquid crystal molecules in a manner different from the incident light passing through the LCD unit at a normal angle. Thus, the contrast between a light transmissive (white) state and a non-transmissive state (black) at other than the normal angle is drastically decreased, thus making such displays less desirable for use in many applications, such as flat panel television screens and large computer screens.

The present invention therefore seeks to provide a VA LCD that overcomes or at least reduces the aforementioned problems of the prior art.

SUMMARY OF THE INVENTION

It is a principle object of the invention to provide a vertically-aligned (VA) liquid crystal display having high contrast over a wide viewing angle.

The LCD according to a general aspect of the present invention mainly comprises a first substrate and a second substrate treated for vertical alignment; a liquid crystal having a negative dielectric constant anisotropy and being sandwiched between the first and second substrates; and an array of first protrusions, second protrusions and third protrusions for setting the orientation of liquid crystal molecules inside pixels into multi-domain or into a plurality of mutually different directions thereby improving the viewing angle performance of the LCD.

The first protrusions are formed on pixel electrodes provided on the second substrate in a manner that every two of the first protrusions are arranged substantially in a V-shaped pattern. The second and third protrusions are formed on the first substrate wherein each of the second protrusions is in a V-shaped pattern. A plurality of gate lines and a plurality of parallel data lines perpendicular to the gate lines are disposed on the second substrate wherein the pixel electrodes are defined by the gate lines and the data lines and arranged to form a matrix on the second substrate. The pixel electrodes have first edges parallel to the gate lines and second edges parallel to the data lines. The first protrusions and the second protrusions are arranged alternately and in parallel to one another, and each of the third protrusions extends from the bend of the V-shaped pattern of the first protrusions toward the second edge of the pixel electrode.

The LCD according to one embodiment of the present invention is characterized by having a storage capacitor (Cs) with capacitor electrodes substantially located under and in alignment with the first protrusions. Therefore, the aperture ratio (i.e., the ratio of the active area which is transparent to the total area) is not substantially reduced more than it would be reduced by the capacitor electrodes alone thereby improving display luminance while saving power consumption at the same time.

According to another embodiment of the present invention, each of the second protrusions and the third protrusions has branches formed at positions facing to the second edges of the pixel electrode. The angle between the branches and the first protrusions is kept at most 45 degrees, thereby significantly reducing the difference between the directors (i.e., the average direction of the long axes of the liquid crystal molecules) of the liquid crystal molecules in the neighborhood of the intersection area of the branches and the first protrusions down to at most 45 degrees. Therefore, disclination occurring at the border between the first protrusions and the edges of the pixel electrodes is significantly suppressed thereby avoiding display defects due to the disclination.

The LCD according to the present invention is preferably provided with a plurality of fourth protrusions formed on the second substrate at positions facing to the data lines thereby significantly suppressing disclination occurring in the neighborhood of the data lines. Alternatively, each of the fourth protrusions may be divided into a plurality of partial protrusions thereby facilitating the stabilization of the orientation of the liquid crystal molecules in the neighborhood of the data lines to enhance the response rate.

According to still another embodiment of the present invention, the pitch between the first protrusion and the second protrusion is enlarged, and the branches are elongated. This reduces the length of the edges of the pixel electrode not covered by the branches thereby facilitating the stabilization of the orientation of the liquid crystal molecules in the neighborhood of the data lines to enhance the response rate.

According to a further embodiment of the present invention, the second protrusions and the branches of the third protrusions may be interconnected by a plurality of fifth protrusions. It is noted that the fifth protrusions extends across the data lines so as to divide the liquid crystal molecules in the neighborhood of the data line into several groups thereby facilitating the stabilization of the orientation of the liquid crystal molecules in the neighborhood of the data lines to enhance the response rate.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 1:
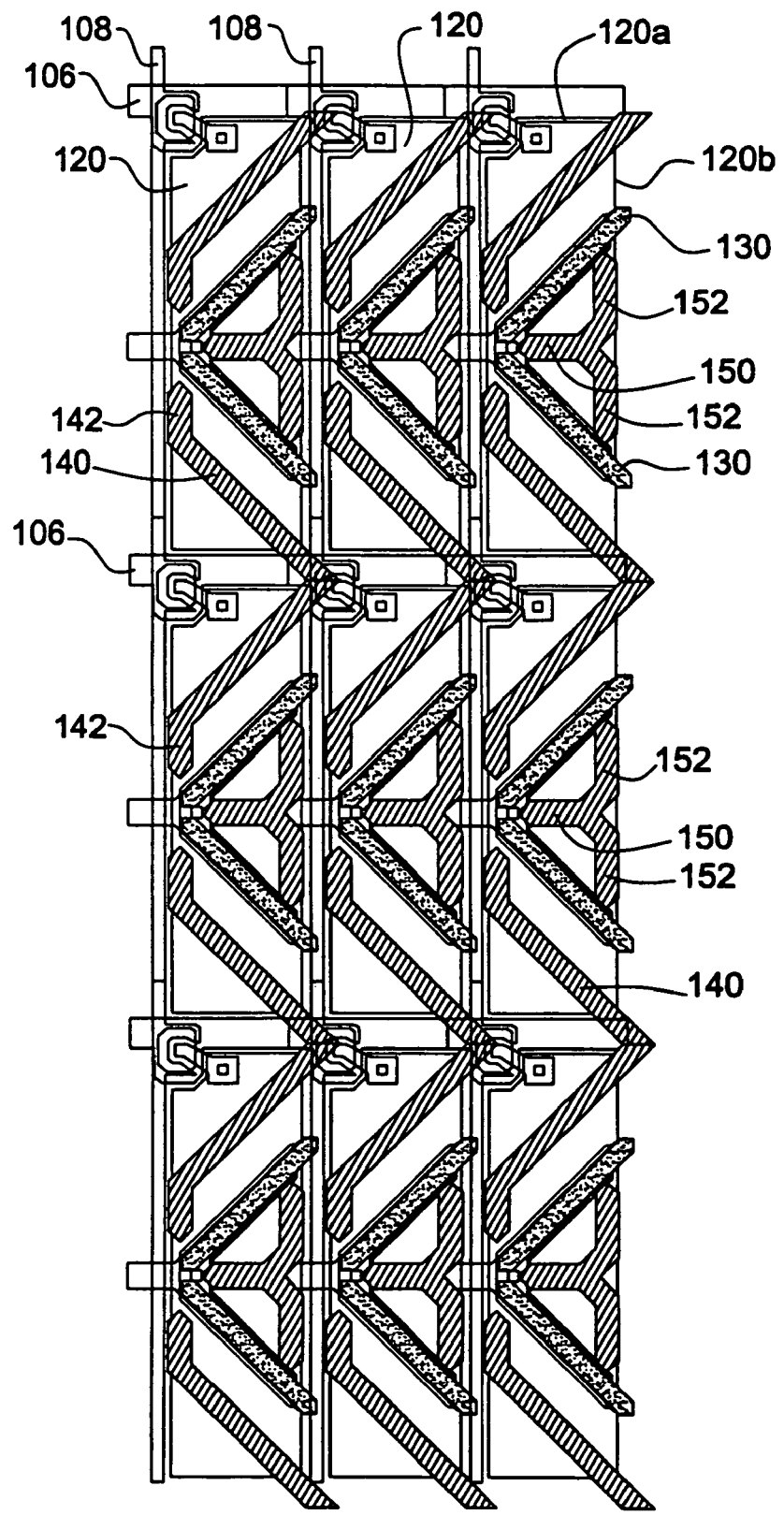
FIG. 1 is a plan view of pixel regions of a vertically-aligned (VA) LCD showing specific protrusions pattern according to a first embodiment of the present invention.
Figure 2:
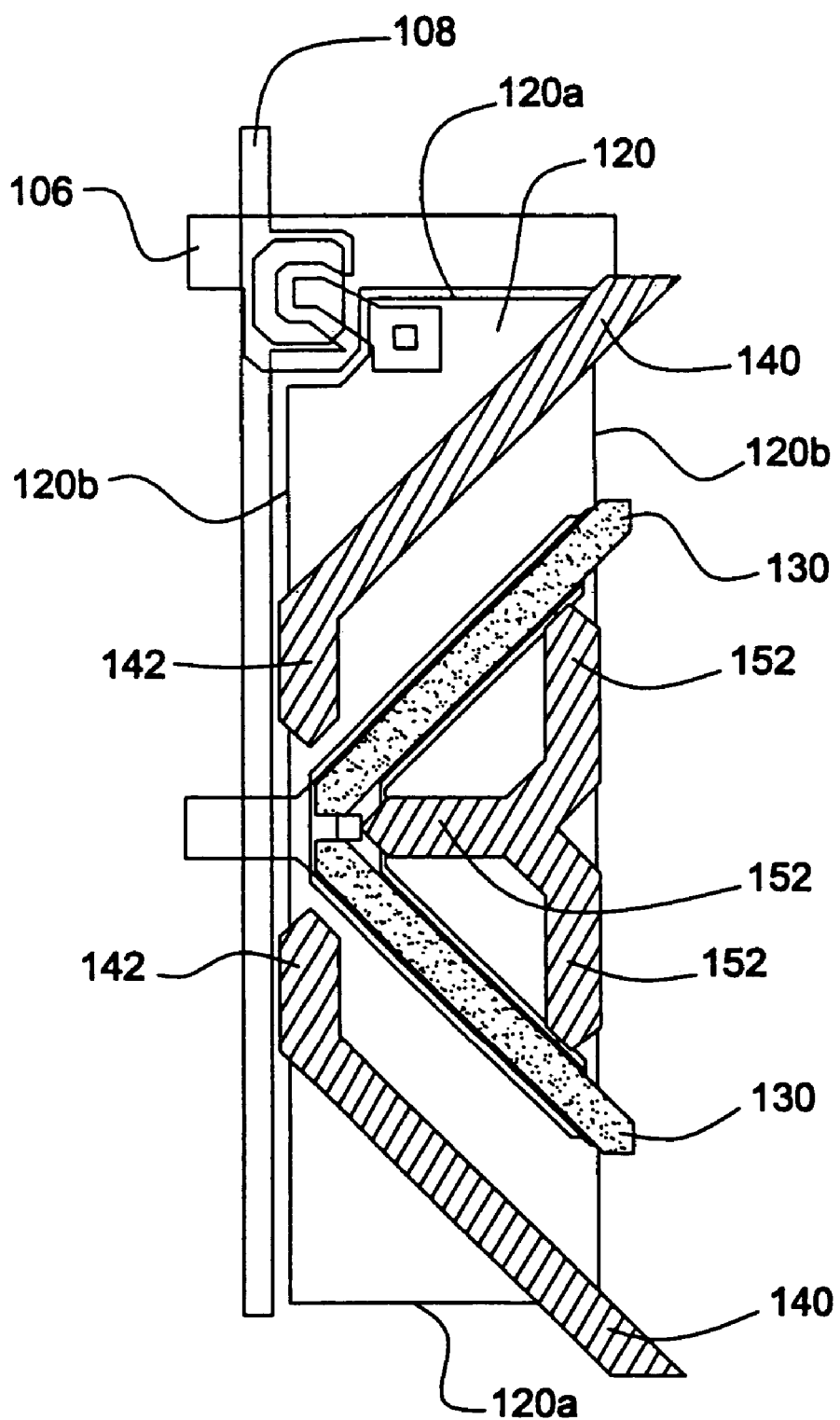
FIG. 2 is a plan view of a single pixel region of the vertically-aligned (VA) LCD according to the first embodiment of the present invention.

FIGS. 1 and 2 show the pixel region(s) of a vertically-aligned (VA) liquid crystal display device (LCD) with specific protrusion pattern for regulating the orientation of a liquid crystal in which liquid crystal molecules are aligned obliquely when an electric field is applied so that the orientation of the liquid crystal within each pixel will include a plurality of directions thereby improving the viewing angle performance of the LCD.

Figure 8:
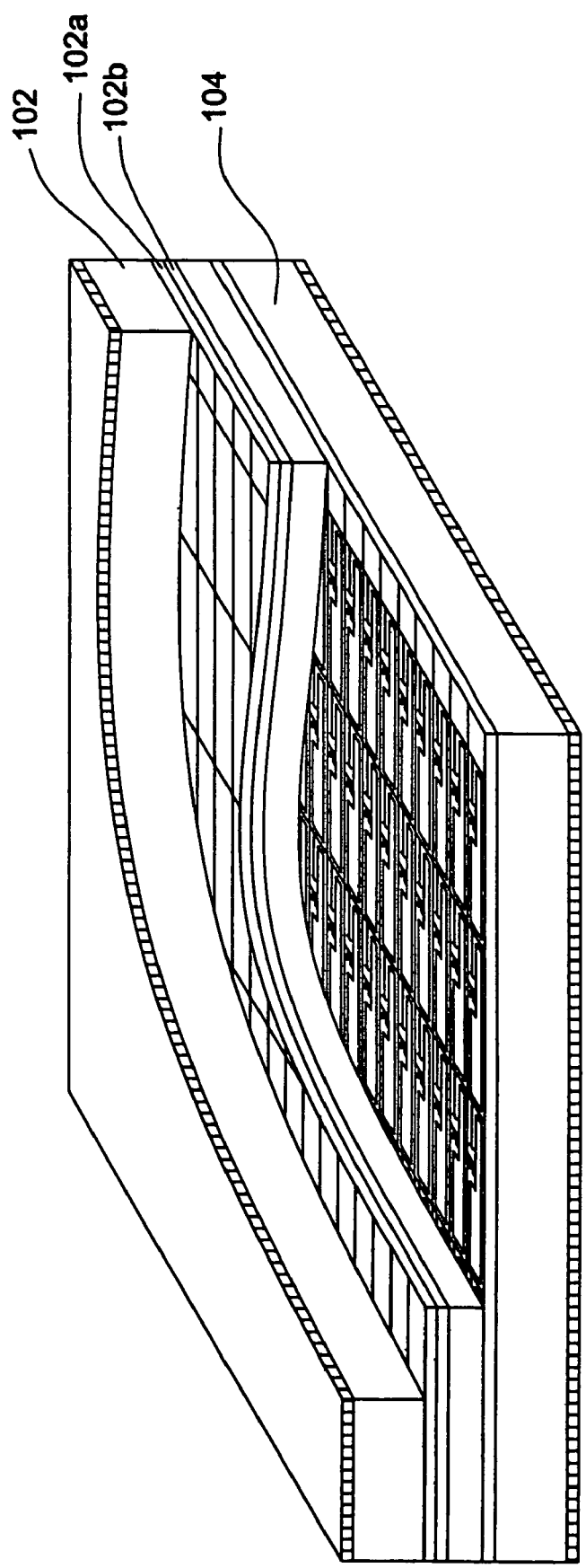
FIG. 8 is a partial cutaway view of a vertically-aligned (VA) LCD according to one embodiment of the present invention.

The LCD according to the present invention mainly comprises a first substrate and a second substrate. The surfaces of the substrates are treated for vertical alignment. A liquid crystal having a negative dielectric constant anisotropy is sealed between the two substrates. The VA LCD of the present invention is preferably a thin-film transistor LCD. As shown in FIG. 8, the first substrate 102 has a light-shielding matrix, for example a black matrix (not shown in FIG. 8), formed thereon; a plurality of color filters 102a and a common electrode 102b. As shown in FIG. 1, the second substrate 104 is provided with a plurality of parallel gate lines 106, a plurality of parallel data lines 108 perpendicular to the gate lines 106, and a plurality of thin film transistors (TFTs) and pixel electrodes 120 formed in a matrix at the intersections between the gate lines and data lines. Typically, the first substrate 102 is referred to as a color filter (CF) substrate because color filters are formed, while the second substrate 104 is referred to as a TFT substrate. Usually, spacers (not shown) are formed between the substrates for defining the gap between the substrates.

Referring to FIGS. 1 and 2, the pixel electrode 120 is provided within a pixel region defined by two adjacent gate lines 106 and data lines 108. The pixel electrode 120 has first edges 120a parallel to the gate lines and second edges 120b parallel to the data lines. According to the present invention, the LCD has an array of first protrusions 130, second protrusions 140 and third protrusions 150 for setting the orientation of the liquid crystal molecules inside pixels into multi-domain or into a plurality of mutually different directions. The first protrusions 130 are formed on the pixel electrodes 120 in a manner that every two of the first protrusions 130 are arranged substantially in a V-shaped pattern. Alternatively, every two of the first protrusions 130 may be interconnected to each other and arranged in a V-shaped pattern. It is noted that each of the first protrusions has a portion extends to one of the data lines 108 for separating the liquid crystal molecules disposed around the area over the data line 108 into several groups thereby facilitating the stabilization of the orientation of the liquid crystal molecules in the area over the data line 108 to enhance the response time. The second protrusions 140 and the third protrusions 150 are formed on the first substrate 102. As shown in FIG. 1, each of the second protrusions 140 is in a V-shaped pattern and the first protrusions 130 and the second protrusions 140 are arranged alternately and in parallel to one another. Each of the third protrusions 150 extends from the bend of the V-shaped pattern of the first protrusions toward the second edge 120b of the pixel electrode.

Figure 3:
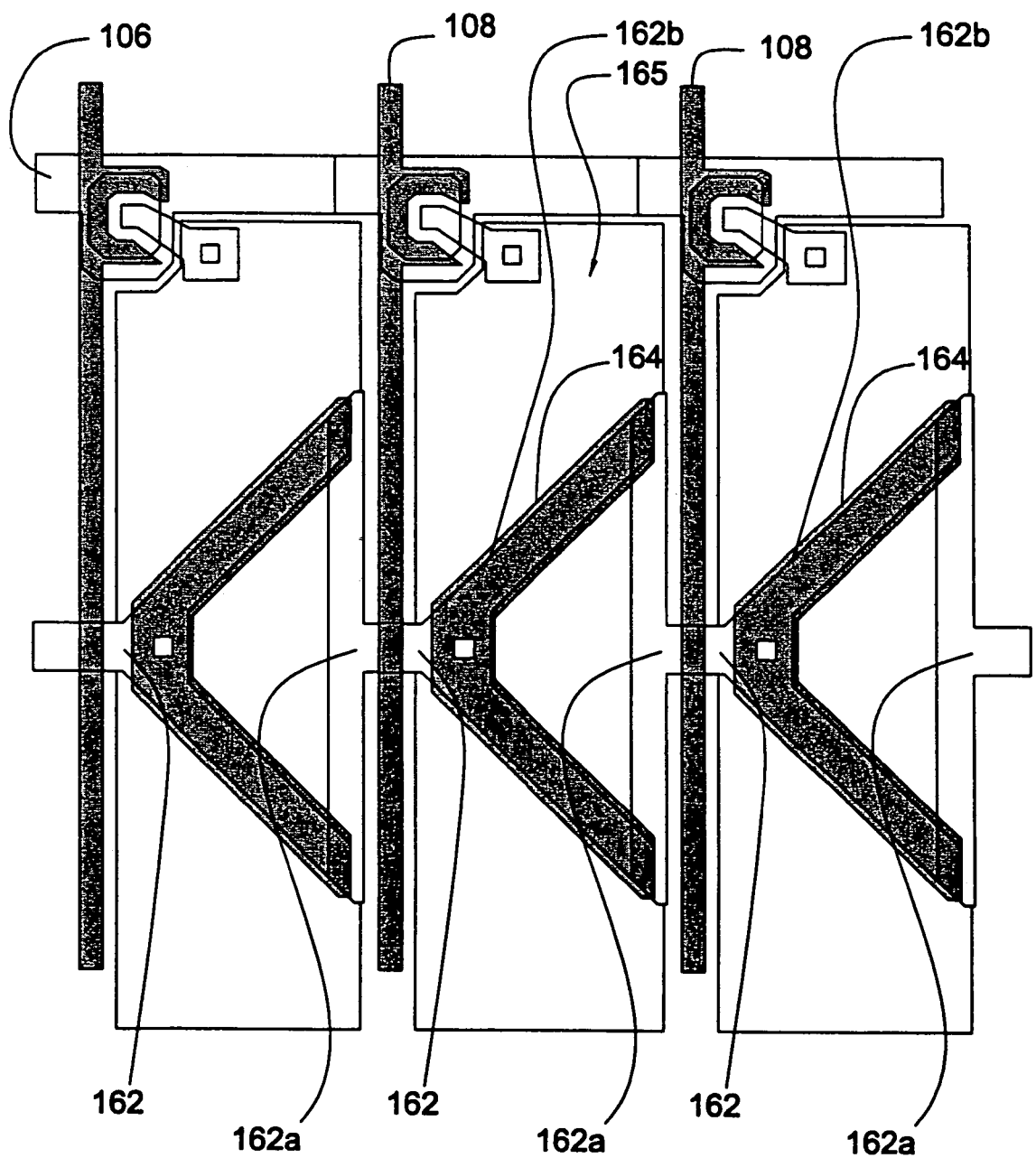
FIG. 3 is a plan view of pixel regions of a vertically-aligned (VA) LCD illustrating storage capacitors provided in the LCD according to one embodiment of the present invention.

In the LCD of the present invention, storage capacitors (Cs) are provided in pixel regions. Since TFTs access to the storage capacitors are formed simultaneously with Cs, a gate metal layer is used to form first capacitor electrodes 162 (see FIG. 3) as well as gate electrodes for TFTs, and a data metal layer, which is hatched in FIG. 3 to facilitate understanding, is used to form second capacitor electrodes 164 as well as source/drain electrodes for TFTs. Each of the first capacitor electrodes 162 has a first portion 162a disposed in one pixel region and a second portion 162b in a V-shaped pattern disposed in adjacent pixel region. An interconnecting portion is provided in each pixel region for electrically coupling the second capacitor electrode 164 to the pixel electrode 120 such that the second capacitor electrode 164 and the pixel electrode 120 together functions as a counter electrode to the first capacitor electrode 162. The interconnecting portion may include a via hole, and the connection through the via hole may be formed by a metal layer, e.g., ITO, used to form the pixel electrode 120. It should be understood that since each of the first capacitor electrodes 162 is formed across two adjacent pixel regions, the first portion 162a and the second portion 162b thereof are used to form two storage capacitance unit with counter electrodes in different pixel regions. For example, in the pixel region 165, the second portion 162b of the first capacitor electrode 162 located at the left-hand side forms a storage capacitance unit with the second capacitor electrode 164 and the pixel electrode 120, and the first portion 162a of the first capacitor electrode 162 located at the right-hand side forms another storage capacitance unit with the pixel electrode 120. The storage capacitance unit's purpose is to maintain voltage at the pixel electrode within specified limits for a predetermined amount of time after the TFT has been turned off. Since the gate metal layer and the data metal layer are formed of an opaque metal, the capacitor electrodes 162, 164 are also opaque. As described above, the capacitor electrodes are formed in the pixel region, and therefore the portion of the capacitor electrodes cannot be used as a display area thereby reducing aperture ratio (i.e., the ratio of the active area which is transparent to the total area). Since the liquid crystal display is required to have an improved display luminance while saving power consumption at the same time, the aperture ratio is preferably as high as possible. Therefore, according to one embodiment of the present invention, the first capacitor electrode 162 is formed in a K-shaped pattern, and the second capacitor electrode 164 is formed in a V-shaped pattern and located under and in alignment with the first protrusion 130. Since the capacitor electrodes 162, 164 and the first protrusions 130 are all substantially superposed one on another, the aperture ratio is not substantially reduced more than it would be reduced by the capacitor electrodes alone. It follows, therefore, that the aperture ratio is not reduced by the provision of the first protrusions 130.

Referring to FIGS. 1 and 2, the direction in which the liquid crystal molecules are tilted by the edges 120b of the pixel electrodes is considerably different from the tilting direction due to the first protrusions 130. This results in disclination generating at the border between the domain formed by the edges 120b of the pixel electrode and the domain formed by the first protrusions 130. Therefore, a blackening region is shown in the vicinity of the intersection area of the first protrusions 130 and the edges 120b of the pixel electrodes. Therefore, each of the second protrusions 140 and the third protrusions 150 has branches 142, 152 formed at positions facing to the second edges 120b of the pixel electrode. It is noted that the angle included between the branches 142, 152 and the first protrusions 130 is kept at most 45 degrees, thereby significantly reducing the difference between the directors of the liquid crystal molecules disposed around the intersection area of the branches 142, 152 and the first protrusions 130 down to at most 45 degrees. As used in the present invention, the word "director" means "the average direction of the long axes of the liquid crystal molecules." It follows, therefore, that the disclination occurring at the border between the first protrusions 130 and the edges 120b of the pixel electrodes is significantly suppressed. However, the inventors had observed that the display quality of the embodiment illustrated in FIGS. 1 and 2 deteriorates around the area over the data lines 108 in the pixel region. This is due to the direction in which the liquid crystal molecules are tilted by the edges 120b of the pixel electrodes is considerably different from the tilting direction due to the data lines 108. This results in the disturbance of liquid crystal orientation thereby increasing response time.

Figure 4:
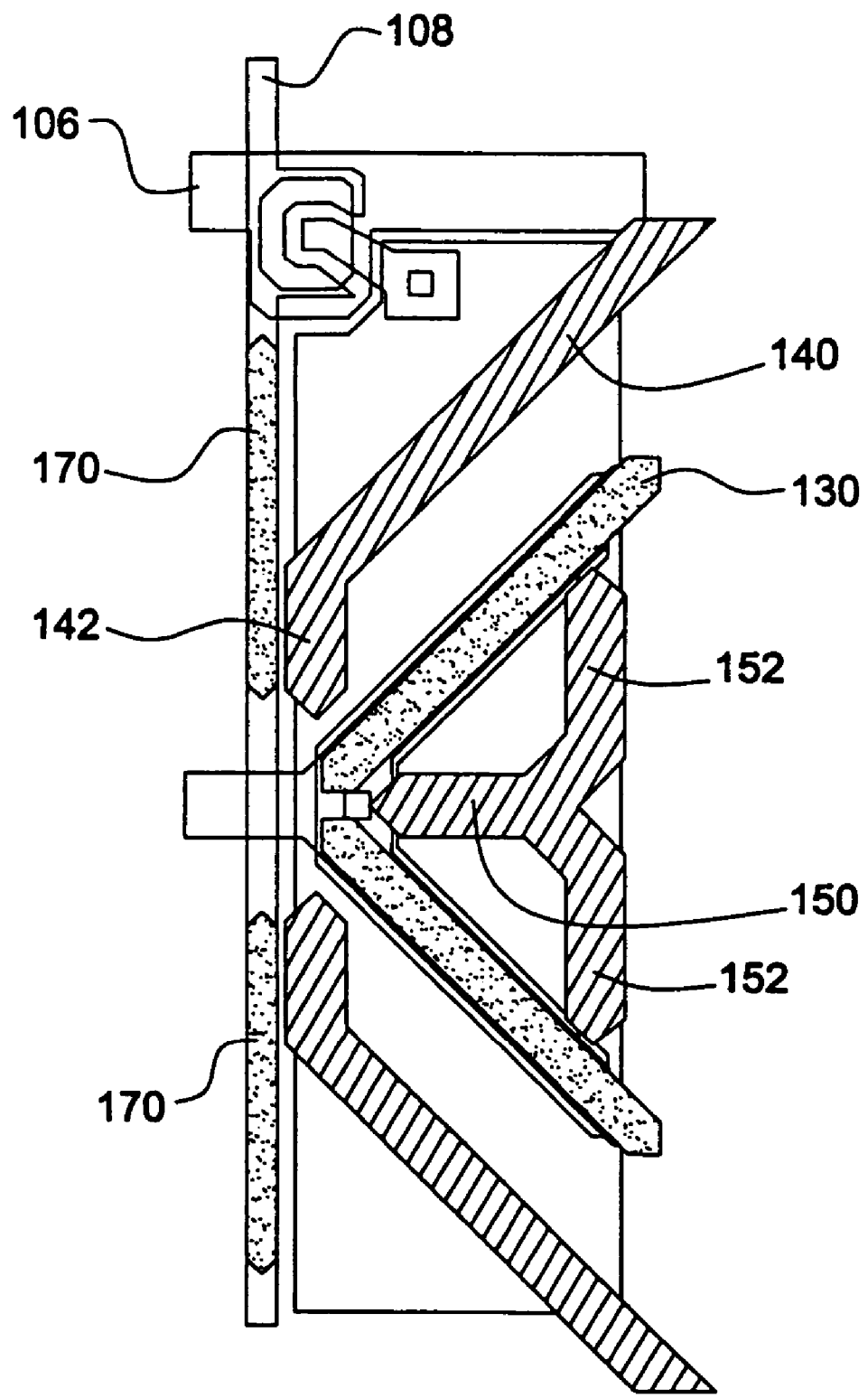
FIG. 4 is a plan view of a single pixel region of a vertically-aligned (VA) LCD according to a second embodiment of the present invention.

The LCD according to a second embodiment of the present invention is further provided with a plurality of fourth protrusions 170 for solving the problem described above. As illustrated in FIG. 4, the protrusions 170 are formed on the second substrate at positions facing to the data lines 108. Since the direction in which the liquid crystal molecules are tilted by the protrusions 170 coincides with the tilting direction due to the edges 120b of the pixel electrodes, the disclination occurring in the neighborhood of the data lines 108 is significantly suppressed.

Figure 5:
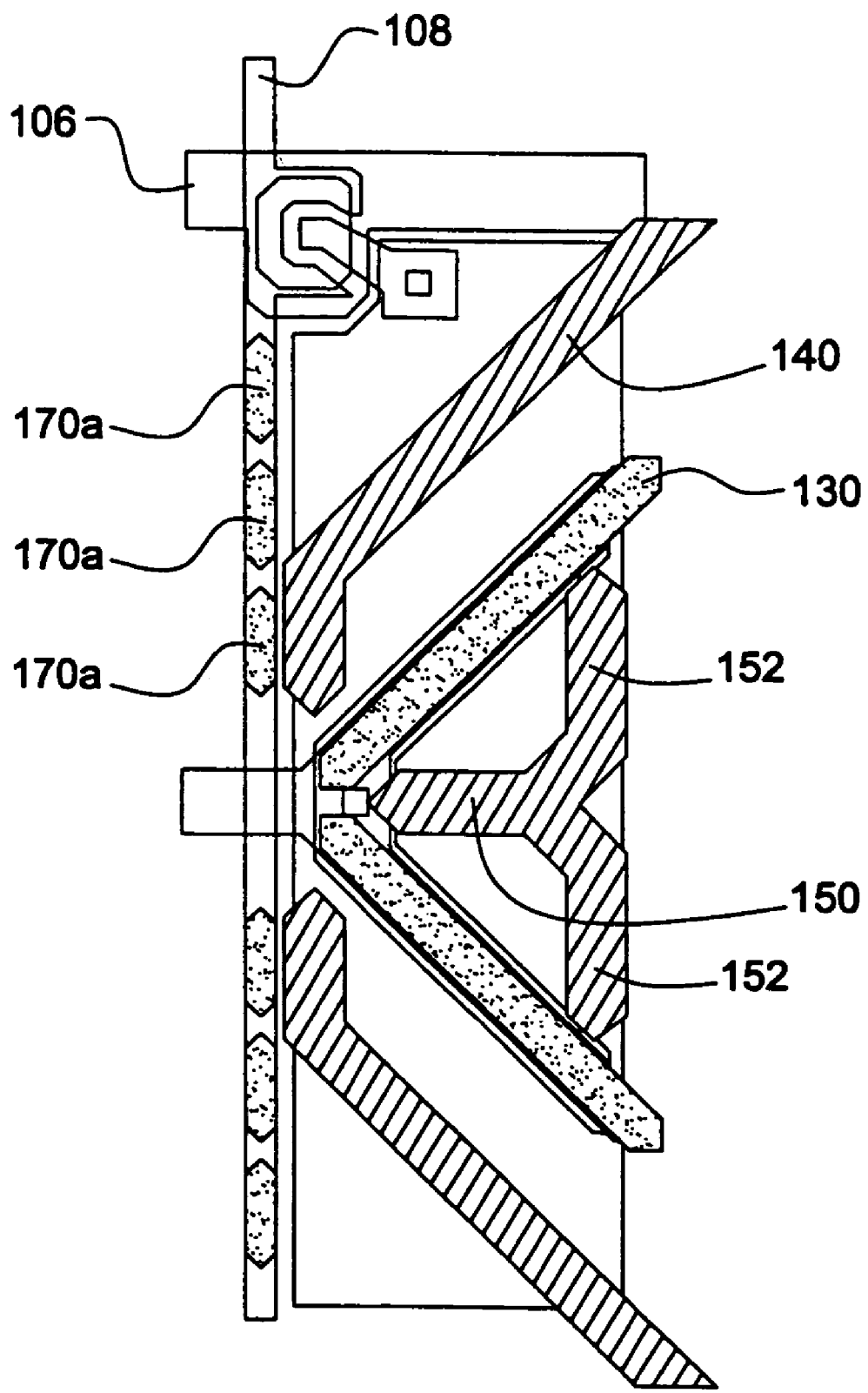
FIG. 5 is a plan view of a single pixel region of a vertically-aligned (VA) LCD according to a third embodiment of the present invention.

FIG. 5 shows the pixel region of a vertically-aligned (VA) liquid crystal display device (LCD) according to a third embodiment of the present invention. The LCD is characterized in that each of the fourth protrusions is divided into a plurality of partial protrusions 170a thereby facilitating the stabilization of the orientation of the liquid crystal molecules disposed around the area over the data lines 108 to enhance the response time.

Figure 6:
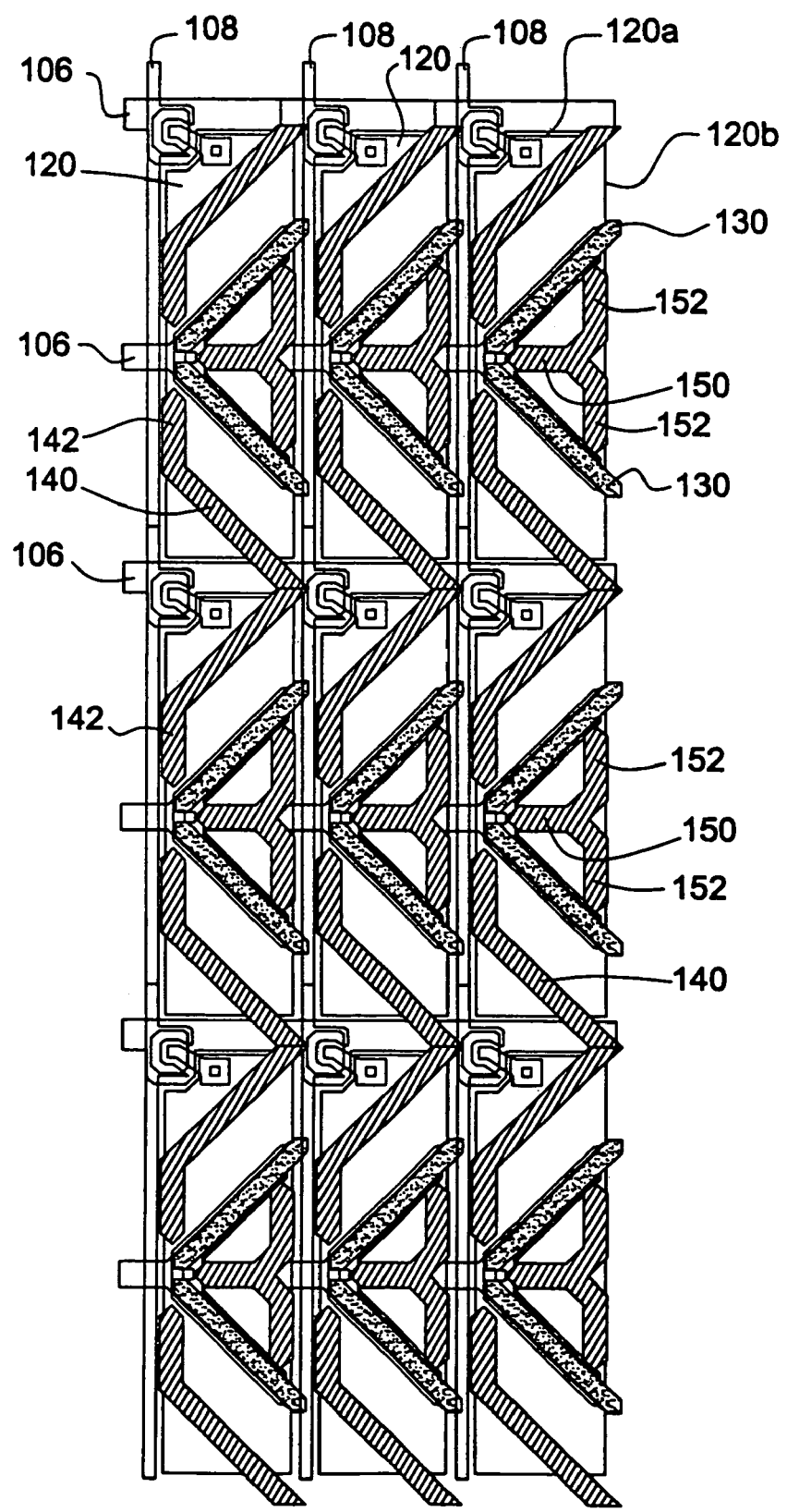
FIG. 6 is a plan view of a single pixel region of a vertically-aligned (VA) LCD according to a fourth embodiment of the present invention.

FIG. 6 shows the pixel region of a vertically-aligned (VA) liquid crystal display device (LCD) according to a fourth embodiment of the present invention. Compared to the LCD illustrated in FIG. 1, this embodiment is characterized in that the pitch between the first protrusion 130 and the second protrusion 140 is enlarged, and the branches 142 are elongated. This reduces the length of the edges 120b of the pixel electrode not covered by the branches 142 thereby facilitating the stabilization of the orientation of the liquid crystal molecules disposed around the area over the data lines 108 to enhance the response time.

Figure 7:
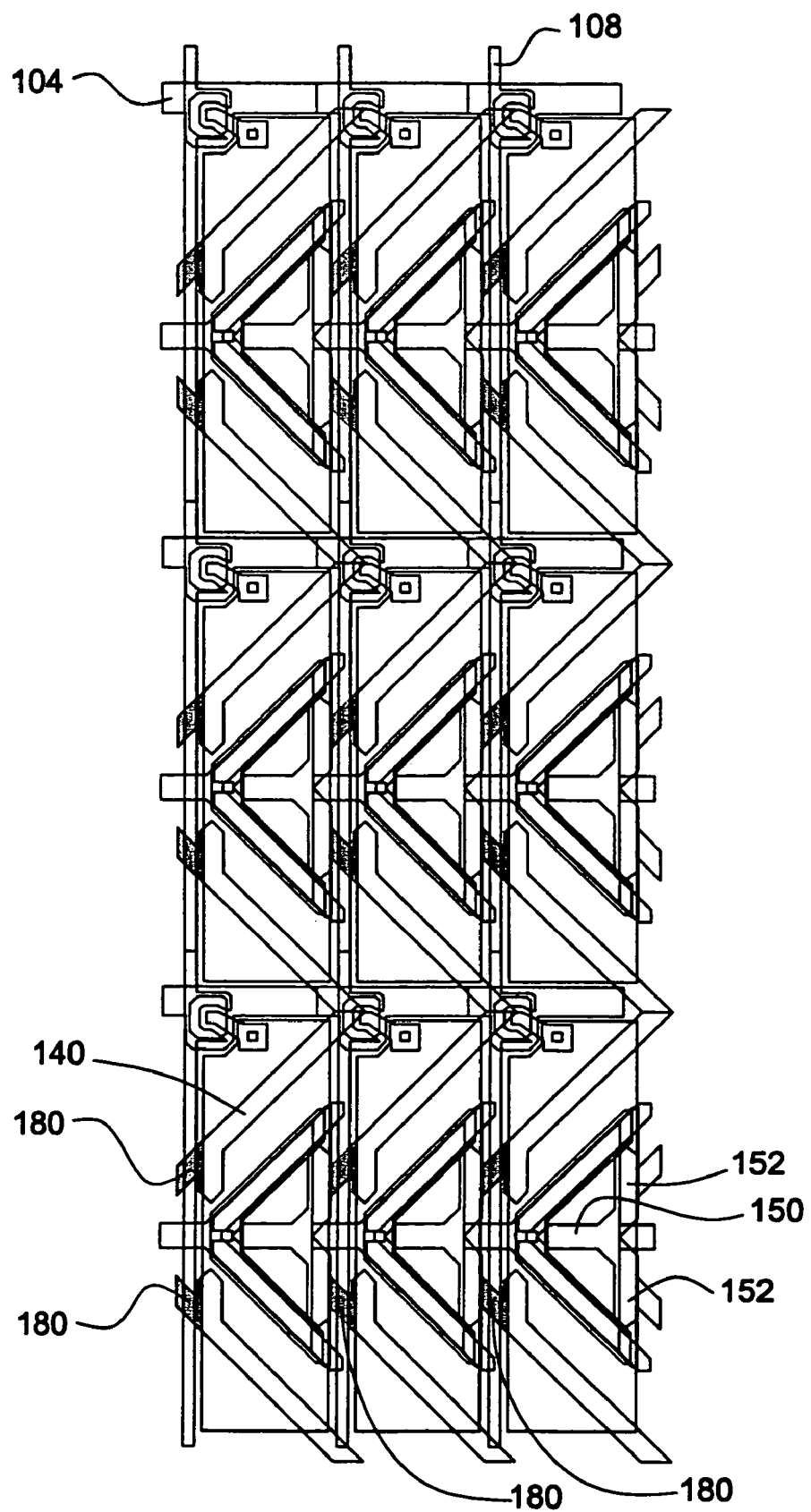
FIG. 7 is a plan view of a single pixel region of a vertically-aligned (VA) LCD according to a fifth embodiment of the present invention.

FIG. 7 shows the pixel region of a vertically-aligned (VA) liquid crystal display device (LCD) according to a fifth embodiment of the present invention. Compared to the LCD illustrated in FIG. 1, this embodiment is characterized by having a plurality of fifth protrusions 180 interconnecting the second protrusions 140 and the branches 152 of the third protrusions 150. It is noted that the fifth protrusions 180 extends across the data lines 108 such that the liquid crystal molecules disposed around the area over the data line 108 are divided into several groups thereby facilitating the stabilization of the orientation of the liquid crystal molecules in the neighborhood of the data lines 108 to enhance the response rate.

Next, processes for forming the protrusions will be described as below. For example, when the protrusions 140, 150 are formed on the CF substrate, a photoresist is coated on the surfaces thereof, transferred a predetermined pattern (referring to the protrusions pattern showed in FIG. 1), and then developed to form the protrusions 140, 150. This process is easily carried out by using conventional techniques. Even when protrusions are formed as a pattern like the protrusions 130 shown in FIG. 1 on the pixel electrode 120, nearly the same process as the foregoing one is adopted.

Although the invention has been explained in relation to its preferred embodiment, it is to be understood that many other possible modifications and variations can be made without departing from the spirit and scope of the invention as hereinafter claimed.

What is claimed is:

1. A liquid crystal display comprising:
 a first substrate and a second substrate processed for vertical alignment;
 a liquid crystal having a negative dielectric constant anisotropy and being sandwiched between the first and second substrates;
 a plurality of gate lines on the second substrate;
 a plurality of parallel data lines perpendicular to the gate lines, the gate lines and the data lines being arranged to form a matrix of pixel regions with each of the pixel regions bounded by two adjacent gate lines and two adjacent data lines;
 at least a pixel electrode disposed in each of the pixel regions; and
 a plurality of first capacitor electrodes and a plurality of second capacitor electrodes, each of the first capacitor electrodes and a corresponding second capacitor electrode forming a capacitor in one of the pixel regions, wherein the second capacitor electrode is formed in a V-shaped pattern.

2. The liquid crystal display as claimed in claim 1, wherein the first capacitor electrode is formed in a K-shaped pattern and disposed across two adjacent pixel regions.

3. The liquid crystal display as claimed in claim 1, further comprising an array of protrusions on the pixel electrodes provided on the second substrate, every two of the protrusions being arranged substantially in a V-shaped pattern and in alignment with the second capacitor electrode.

* * * * *